June 15, 1971            A. FRICK            3,584,408
FISHING TACKLE
Filed Oct. 21, 1969            2 Sheets-Sheet 2
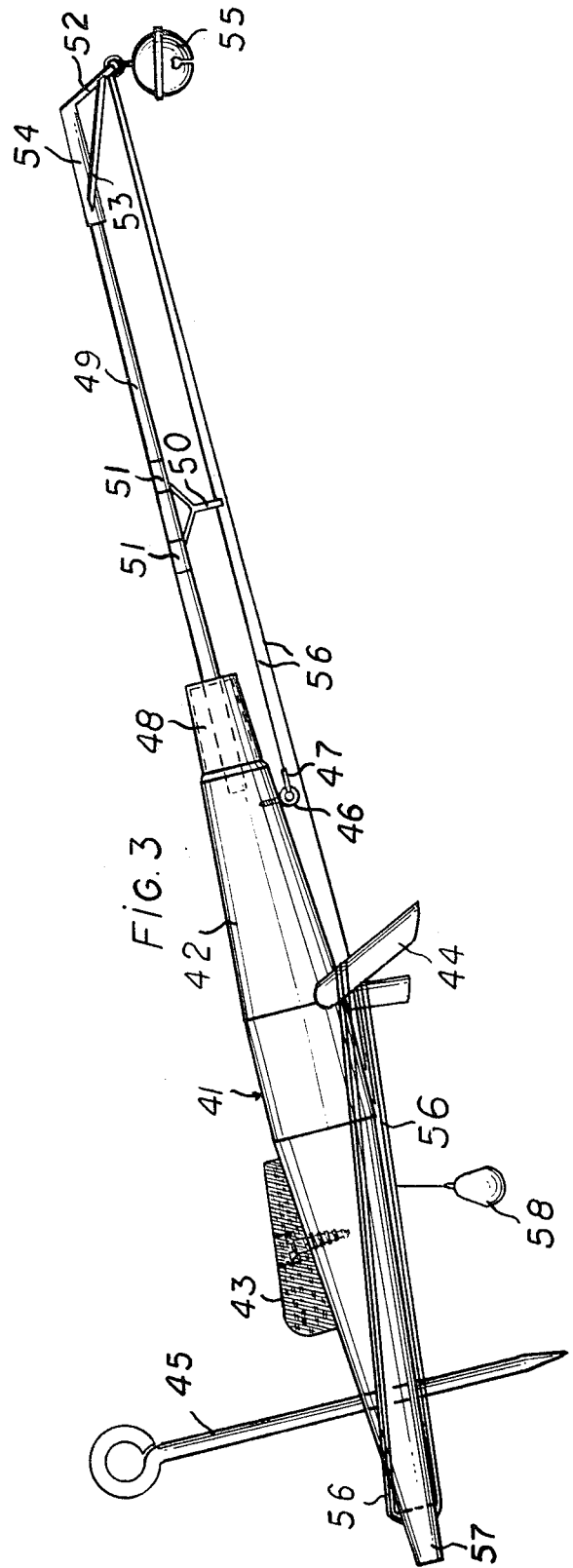
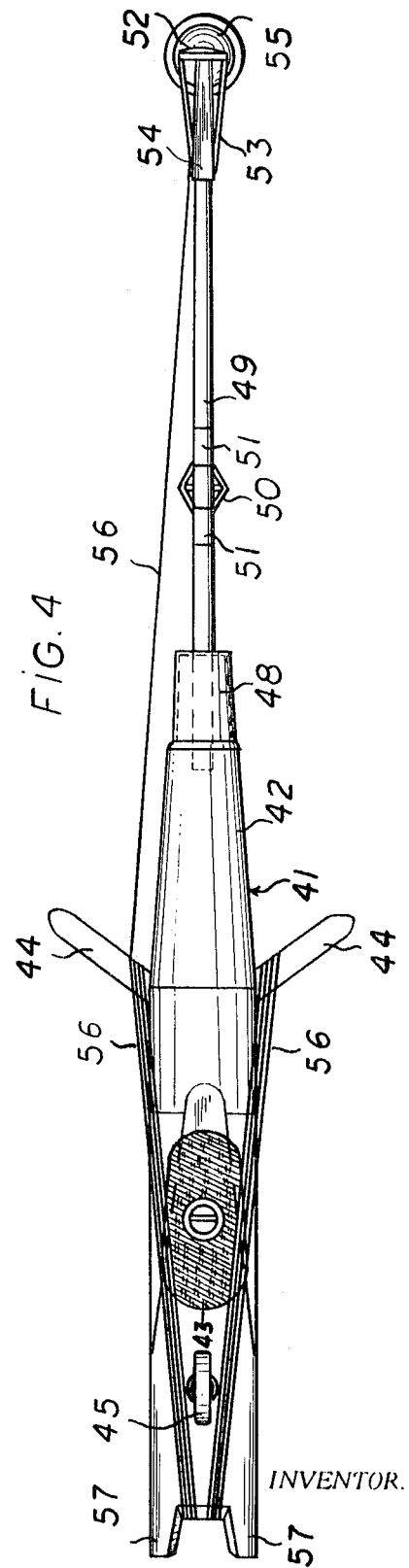
INVENTOR.
Alexander Frick United States Patent Office 3,584,408
Patented June 15, 1971

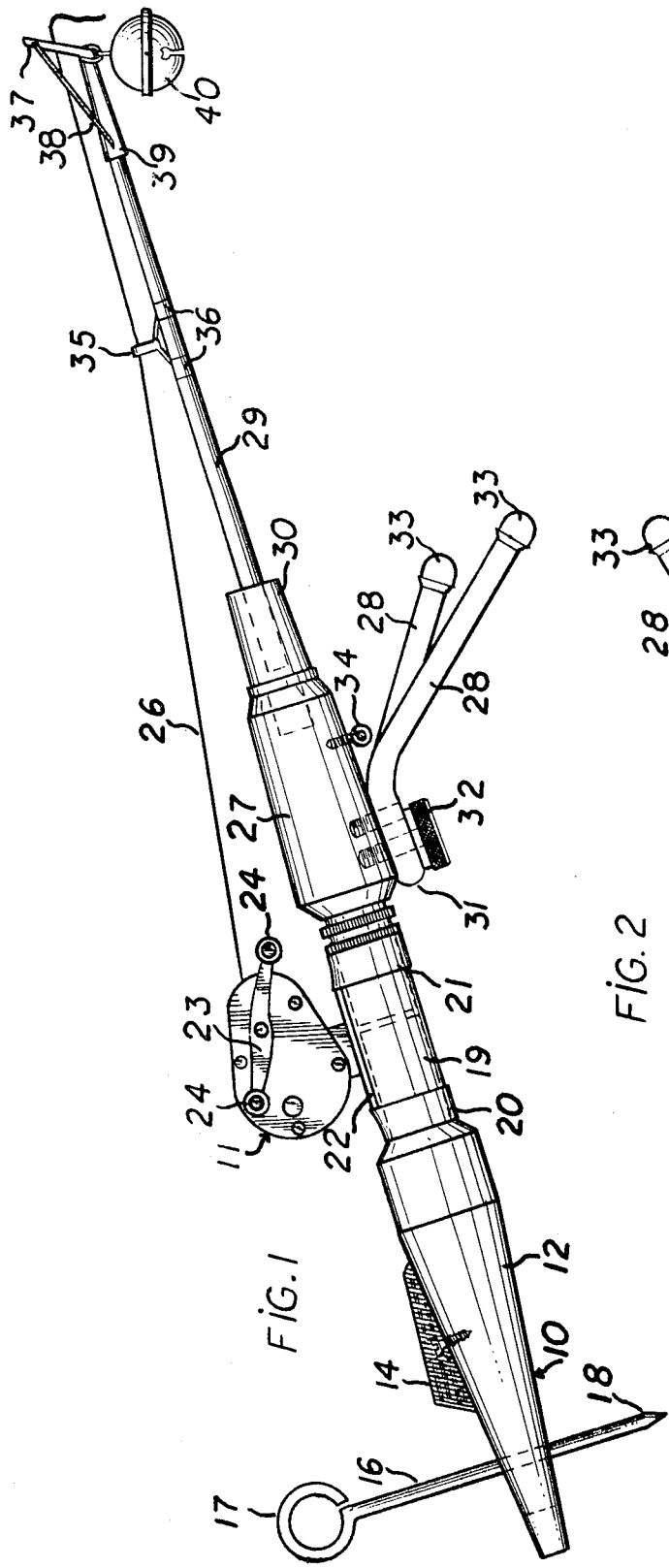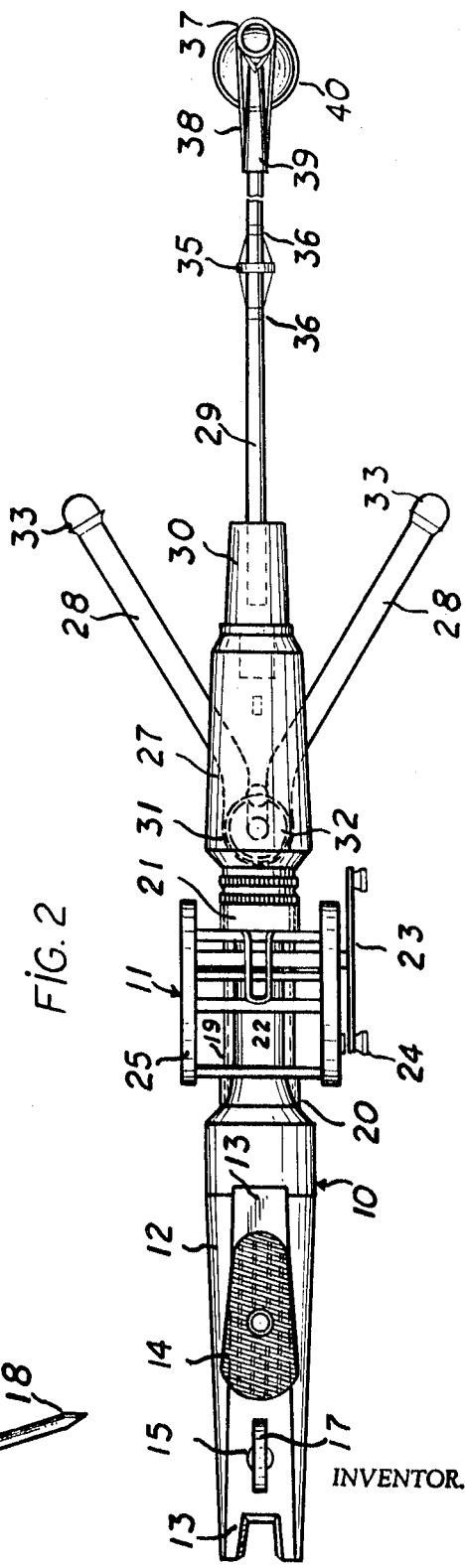

FISHING TACKLE
Alexander Frick, G.P.O. Box 26, Flushing, N.Y. 11352
Filed Oct. 21, 1969, Ser. No. 868,184
Int. Cl. A01k 97/12
U.S. Cl. 43—17     3 Claims

ABSTRACT OF THE DISCLOSURE

A fishing tackle comprising an elongated stand supported on the ground by legs fixed to the stand intermediate its ends and by a spike inserted into the ground adjacent its rear end. A fishing rod having line guides thereon is engaged with the forward end of the stand and a bell is mounted on the outer end of the rod to signal the bite of a fish. The stand may be used with a reel, in which case the line guides on the rod are extended in the same direction as the reel, or without a reel, wherein the line is secured to the underside of the stand and the guides are extended downwardly.

---

This invention relates to fishing tackle and refers more particularly to fishing tackle made with or without a fishing reel.

An object of the present invention is the provision of a ground fishing tackle of this type which may be used most effectively for day and night fishing and fresh-water and salt-water fishing.

Another object is the provision of a ground fishing tackle of this type which is particularly suitable for night fishing, since it can be safely secured to the ground and is provided with a bell which rings as soon as a fish bites the bait.

Another object is the provision of a fishing tackle which does not have to be held continuously in the hands of the fisherman, so that the fisherman can leave the tackle and engage in other occupations while continuing the fishing.

Other objects of the present invention will be come apparent in the course of the following specification.

In the accomplishment of the objectives of the present invention is was found desirable to make a fishing tackle of two types, namely, with or without a fishing reel. Both types include a ground fishing stand which can be supported on the ground by two legs fixed to the stand intermediate its ends. The rear end of the stand has an opening for the insertion of a peg or spike so that the stand can be firmly fixed to the ground in a slightly upwardly directed position. A suitable cap or sleeve connected with the stand at its forward end carries an elongated fishing rod. The free end of the rod carries a guide for the line along with a bell which will ring as soon as a fish bites the bait. Other line guides are located in the middle of the rod. A piece of cork is preferably fixed to a rear portion of the stand to carry the hook when the tackle is not being used.

The fishing tackle with the fishing reel is usually larger in size. It has a reel seat made of metal tubing and located between the stand and the rod-carrying sleeve. The reel may be of the usual type and is provided with a plate for fixing it to the reel seat as well as two handles for winding and unwinding the line.

The fishing tackle without the reel has a stand which is directly connected with the rod by a cap. A metal loop carried upon a bottom surface of the stand is used for attaching one end of the line thereto. The rear end of the stand is bifurcated, so that the line can be conveniently wound between the bifurcated ends and the legs of the stand when the tackle is not being used.

The invention will appear more clearly from the following detailed description when taken in connection with the accompanying drawings, showing, by way of example only, preferred embodiments of the inventive idea.

In the drawings:

FIG. 1 is a side view of a fishing tackle provided with a fishing reel and constructed in accordance with the principles of the present invention;

FIG. 2 is a top view of the fishing tackle shown in FIG. 1;

FIG. 3 is a side view of a fishing tackle which does not have a fishing reel;

FIG. 4 is a top view of the fishing tackle shown in FIG. 3.

FIGS. 1 and 2 of the drawings show a fishing tackle 10 provided with a fishing reel 11.

The tackle 10 includes a ground stand having a rear portion 12 preferably made of hard wood and provided with a flattened upper surface 13. A piece of cork 14 is mounted upon the surface 13 and is screwed to the rear stand 12 by a suitable wood screw. The cork 14 is used for carrying the sharp ends of fishing hooks when the stand is not in use. An opening 15 is provided close to the rear end of the portion 12 and is used for holding a peg 16 which has a round top end 17 and a lower sharp point 18. The peg 16 is used for fixing the tackle to the ground as will be described in greater detail hereinafter.

The rear portion 12 is continued as a tubular reel support 19, preferably made of light metal and having an end firmly connected with the adjacent end of the portion 12 by any suitable means. The support 19 carries slightly conical sleeves 20 and 21, the opposite ends of which are somewhat raised from the support so that they can hold the ends of a plate 22 carrying the fishing reel 11.

The fishing reel 11 is of the type well known in the art and, for that reason, is not illustrated in detail. It includes side walls 25, an outer lever 23 carrying two handles 24 and connected by suitable supports and gears with a shaft used for winding and unwinding a line 26.

The outer stand part 27 constitutes a support for the legs 28 and the rod 29. The support 27 is preferably made of hard wood or plastic and is connected at one end by any suitable means with the reel support 19. The other end of the support 27 carries a sleeve 30 which is firmly fixed in the support and which carries one end of the fishing rod 29. Two outwardly-extending metal legs 28 are joined by a curved portion 31 through which extends a screw 32 firmly connecting the legs with the support 27. The ends of the legs 28 carry rubber tips 33, so that the legs can be conveniently placed on the ground. A ring-shaped screw 34 is attached to the bottom surface of the support 27 for use when the stand is used without a reel in a manner described hereinafter.

The rod 29 may be made of glass fibers and its length is variable and may amount to 27 inches. The rod carries a wire line guide 35 for the line 26 and mounted upon the rod 29 by sleeves 36. If necessary, additional line guides (not shown) may be provided upon the rod 29.

The outer end of the rod 29 carries a line guide 37 attached to the rod by angular wires 38 and a sleeve 39. A small ball-shaped bell 40 is suspended from the sleeve 39 and is so arranged that it will ring whenever the line is pulled.

When the reel is used with the stand as in FIG. 1, the line guides 35 and 37 on the rod are positioned upwardly, or on the same side of the rod and stand as the reel 11, with the fishing line 26 extending from the reel through the line guides 35 and 37.

The described fishing tackle can be used for fishing in salt and fresh waters and is particularly suitable for fishing at night. The fisherman holds the tackle in one hand and throws out the line in the usual manner after which he places the tackle on the ground so that it is supported by its two legs 28 and the rear end of portion 12. To hold the tackle in place, the peg 16 is pushed through the opening 15 of the stand and into the ground or sand. Then the fisherman can go away from the tackle and become engaged in other occupations provided he remain within the hearing distance of the bell 40. The bell 40 will start ringing as soon as a fish begins pulling the line 26 at which time the fisherman will pick up the stand and rod and pull in the line in the usual manner, operating the reel 11. As a precautionary measure at the end of the fishing, the hook ends are fixed in the cork piece 14.

FIGS. 3 and 4 illustrate a fishing tackle 41 of a somewhat simpler type without the fishing reel. The tackle is shown with a wound line. As in the previously described construction, the tackle 41 has a stand 42 carrying on top a piece of cork 43 for the hooks and provided at the bottom with two diverging legs 44. At the rear end of the stand 42 there is a hole for a peg 45 used to hold the tackle firmly on the ground. Close to the other end of the stand 42 there is a downwardly-extending wire loop 46 to which the end 47 of the line 56 is attached. A sleeve 48 has one end firmly connected to the stand 42 while its other end is firmly connected to one end of a fishing rod 49. The rod 49 carries at least one line guide 50 which is mounted upon the rod 49 by sleeves 51. The outer end of the rod 49 carries a line guide 52 attached to the rod by angular wires 53 and a sleeve 54. A small ball-shaped bell 55 is suspended from the sleeve 52 and is so arranged that it will ring whenever the line is pulled. In this modification, the line guides 50 and 52 are positioned downwardly, or on the same side of the rod and stand as the loop 46, with the fishing line extending from the loop 46 through the line guides 50 and 52.

In use, the tackle is held in one hand and the line is carefully unwound, making certain that the line extends through the loops 50 and 52. A weight 58 and a baited hook are attached to the end of the line. The fisherman should hold the tackle with one hand and pull with his other hand about 3 feet of the line beyond the end of the rod. Then he swings this part of the line back and forth along with the baited hook and the weight thereon until he is satisfied with the swing and then throws out the line, making certain that the line is fully stretched and that the stand is firmly held. When the line is thrown out completely, the fisherman will place the stand with its legs 44 on the ground and firmly fix the stand by pushing the peg 45 into the ground. When a fish bites, the bell 55 will ring so that the fisherman can pick up the stand and rod and pull in the line in the usual manner. When the fishing is completed, the fisherman will wind the line on the stand 42 around a bifurcated end 57 at the rear end of the stand and one or both of the legs 44.

It should be noted that the stand of FIGS. 1 and 2, which is shown with a fishing reel, can be used without a reel in the same manner as described for the modification of FIGS. 3 and 4. When used without the reel, the rod is turned so that the line guides 35 and 37 are positioned downwardly to be on the same side of the rod and stand as the screw 34, and the fishing line is attached to the screw 34 and passed through the line guides 35 and 37.

Obviously, the fishing with the described tackle can be carried out both in salt and fresh waters, at a sandy beach or from high ground and at any time of the day. However, it is most effective for fishing at night.

I claim:
1. A fishing tackle for use on ground adjacent to a body of water, comprising an elongated stand, two legs being fixedly secured to said stand intermediate its ends, said legs with one end of the stand engaging the ground to position the stand with its other end extended slightly upwardly, said stand having an opening formed adjacent said one end, a peg extending through said opening and into the ground to anchor the stand thereto, a sleeve connected with the other end of the stand, a flexible fishing rod having one end firmly connected with said sleeve, means attached to the stand for securing a fishing line thereto, line guides secured to the rod in alignment with said means with the line extending therethrough, and a bell carried by the outermost of said guides to signal the bite of a fish when the line is pulled and the rod is flexed.

2. A fishing tackle in accordance with claim 1, wherein said means is a wire loop secured to the bottom surface of said stand adjacent said other end thereof.

3. A fishing tackle in accordance with claim 1, wherein said means is a reel secured to the upper surface of said stand intermediate the ends thereof and said legs are attached to the stand forwardly of said reel.

References Cited

UNITED STATES PATENTS

| 578,085 | 3/1897 | Mell | 43—21.2 |
|---|---|---|---|
| 1,092,548 | 4/1914 | Weber | 43—21.2UX |
| 1,531,725 | 3/1925 | Baker | 43—25.2 |
| 2,549,295 | 4/1951 | Derby | 43—18X |
| 2,601,839 | 7/1952 | Kucewicz | 43—17X |
| 3,475,847 | 11/1969 | Wilson | 43—15 |

FOREIGN PATENTS

| 8,980 | 1907 | Great Britain | 43—17 |
|---|---|---|---|
| 504,795 | 12/1954 | Italy | 43—21.2 |

SAMUEL KOREN, Primary Examiner

D. J. LEACH, Assistant Examiner

U.S. Cl. X.R.

43—21.2, 25.2